(12) United States Patent
Frenzel

(10) Patent No.: US 11,811,156 B2
(45) Date of Patent: Nov. 7, 2023

(54) BATTERY POLE TERMINAL

(71) Applicant: Continental Automotive GmbH, Hannover (DE)

(72) Inventor: Henryk Frenzel, Frankfurt am Main (DE)

(73) Assignee: Continental Automotive GmbH

( * ) Notice: Subject to any disclaimer, the term of this patent is extended or adjusted under 35 U.S.C. 154(b) by 398 days.

(21) Appl. No.: 17/089,141

(22) Filed: Nov. 4, 2020

(65) Prior Publication Data
US 2021/0135183 A1    May 6, 2021

(30) Foreign Application Priority Data
Nov. 6, 2019    (DE) .................... 10 2019 217 112.5

(51) Int. Cl.
*H01R 11/28*    (2006.01)

(52) U.S. Cl.
CPC ....... *H01R 11/282* (2013.01); *H01M 2220/20* (2013.01)

(58) Field of Classification Search
CPC .... H01R 11/82; H01R 11/283; H01R 13/565; H01R 11/28; H01R 13/6215
See application file for complete search history.

(56) References Cited

U.S. PATENT DOCUMENTS

| 2003/0198867 | A1 | 10/2003 | Kim |
| 2015/0188117 | A1* | 7/2015 | Kim .................... H01M 50/567 439/762 |
| 2018/0342819 | A1 | 11/2018 | Nobukuni |

OTHER PUBLICATIONS

German Search Report for German Application No. 10 2019 217 112.5, dated Jun. 18, 2020, with partial translation, 8 pages.

* cited by examiner

*Primary Examiner* — Briggitte R. Hammond
(74) *Attorney, Agent, or Firm* — RatnerPrestia

(57) ABSTRACT

A battery pole terminal, having an annular section, which surrounds a cylindrical or conical receiving space at least in sections in a circumferential direction, the annular section having an interruption with respect to the circumferential direction with two opposite edges. A gripping section for a clamping mechanism is provided at each of the edges. Furthermore, the battery pole terminal has a clamping mechanism which acts on the gripping sections and can exert a clamping force on the edges, pushing the opposite edges toward each other. A force limiting mechanism is provided which, when a minimum distance between the edges is reached, prevents an increase in the clamping force on the gripping sections.

10 Claims, 7 Drawing Sheets

BATTERY POLE TERMINAL

CROSS REFERENCE TO RELATED APPLICATIONS

This application claims priority to German Patent Application No. 10 2019 217 112.5, filed Nov. 6, 2019, the contents of such applications being incorporated by reference herein.

FIELD OF THE INVENTION

The invention relates to a battery pole terminal, having an annular section, which surrounds a cylindrical or conical receiving space at least in sections in a circumferential direction, the annular section having an interruption with respect to the circumferential direction with two opposite edges, and a gripping section for a clamping mechanism being provided at each of the edges, and having a clamping mechanism which can exert a clamping force on the edges, pushing the opposite edges toward each other.

BACKGROUND OF THE INVENTION

Battery pole terminals are used in vehicles in order to produce a fixed connection between the vehicle power circuit and the vehicle battery. For example, a cable producing a connection to the vehicle power circuit is fastened to the battery pole terminal. Alternatively, additional components, for example a battery sensor for detecting battery parameters of the vehicle battery, can also be provided at the battery pole terminal.

The battery pole terminal is conventionally pushed with the annular section onto a battery pole of the vehicle battery and clamped on the battery pole by means of a clamping mechanism, which reduces the diameter of the annular section.

During operation of the vehicle, a reliable contact connection of the vehicle power circuit with the vehicle battery has to be ensured throughout the entire service life of the vehicle. The battery pole terminal must not become detached from the battery pole even in the event of oscillations, vibrations or extreme events, for example a vehicle collision. On the other hand, simple removal of the battery pole terminal from the battery pole has to be possible, for example for changing the battery.

Furthermore, it has to be ensured that, even when repeated removal of the battery pole terminal from the battery pole and subsequent fitting to the battery pole is ensured, gripping forces of approximately identical size and thus holding forces of the battery pole terminal on the battery pole are always provided. In particular in the event of incorrect installation, for example if the specified maximum installation forces, in particular specified torques for screws, are exceeded, permanent deformation of the battery pole terminal could occur. Such a deformation of the battery pole terminal could lead to the required holding forces of the battery pole terminal on the battery pole not being able to be achieved.

SUMMARY OF THE INVENTION

An aspect of the invention is a battery pole terminal which, even in the event of excessive installation forces, in particular excessive torques, prevents deformation and therefore a decrease in the holding forces during the installation.

In an aspect of the invention a battery pole terminal is provided, having an annular section, which surrounds a cylindrical or conical receiving space at least in sections in a circumferential direction, the annular section having an interruption with respect to the circumferential direction with two opposite edges, and a gripping section for a clamping mechanism being provided at each of the edges, and having a clamping mechanism which can exert a clamping force on the edges, pushing the opposite edges toward each other. In addition, a force limiting mechanism is provided which, when a minimum distance between the edges is reached, prevents an increase in the clamping force on the edges.

Up to now, battery pole terminals have been produced as highly solid components, for example have been forged, milled or cast. Said solid battery pole terminals have such a high stability that they do not plastically deform even in the event of higher installation forces.

However, current battery pole terminals are frequently designed to be lighter and are produced, for example, in a punching and bending process. Additional measures are required for said battery pole terminals in order to prevent permanent or plastic deformation in the event of excessive installation forces.

This is undertaken with the above-described force limiting mechanism which, when a minimum distance between the edges of the annular section is reached, prevents an increase in the clamping force on the gripping sections. The minimum distance is selected in such a manner that, with said minimum distance, a sufficient gripping force of the battery pole terminal on the battery pole is ensured. If higher installation forces are exerted on the clamping mechanism, the clamping forces which act on the gripping sections and therefore on the edges of the annular section cannot exceed a certain level of force. This level of force is selected in such a manner that the forces acting on the edges cannot lead to permanent deformation of the battery pole terminal. In particular, the gripping sections can therefore be formed by the sections which protrude from the receiving space and on which the clamping mechanism acts. The force limiting mechanism is designed in this case in such a manner that the plastic deformation of said protruding gripping sections is reliably prevented. Even if excessive installation forces act on the clamping mechanism and thus on the battery pole terminal, the force limiting mechanism reliably prevents said high installation forces from being able to be transmitted from the clamping mechanism to the annular section or parts of the annular section.

The force limiting mechanism preferably acts on the clamping mechanism and blocks the latter when the minimum distance is reached. It is thus ensured that, when the minimum distance is reached, higher forces cannot be applied to the annular section or sections of the annular section by the clamping mechanism. Since excessive forces cannot be applied to the annular section, the annular section is reliably prevented from being able to be plastically deformed by excessive installation forces.

For example, the clamping mechanism has two clamping elements which can be moved relative to each other, wherein the force limiting mechanism blocks the movement of at least one clamping element when the minimum distance is reached. The movement of the clamping element can be blocked here relative to the respective other clamping element and/or relative to a section of the annular section. It is merely required for the clamping element to be blocked in such a manner that the clamping force acting on the annular section by means of the clamping mechanism cannot be additionally increased by an increase in the installation force at the clamping mechanism.

For example, the force limiting mechanism can block the movement of at least the first and/or the second gripping section when the minimum distance is reached.

The force limiting mechanism can have a spacer element, with a first stop, on which a contact surface of a first gripping section and/or of a first clamping element lies when the minimum distance is reached, and thus prevents a movement of the gripping section or of the clamping element.

The force limiting mechanism can also have a spacer element, with a second stop, on which a contact surface of a second gripping section and/or of a second clamping element lies when the minimum distance is reached. The spacer element therefore has two stops, wherein a section of the annular section, in particular a gripping section, and/or a clamping element lies on each of the stops when the minimum distance is reached. For example, the section of the annular section can also be gripped between the respective stop and the clamping element so as to act as a force transmission element between the clamping element and the spacer element, i.e. a movement of the clamping element is blocked by means of the stop.

The spacer element here can be a separate component which is held at the clamping mechanism and/or at at least one of the gripping sections. The spacer element here can be selected, for example, depending on the desired gripping forces at the battery pole, i.e. a desired minimum distance. In particular, the spacer element is held captively at the clamping mechanism and/or at one of the gripping sections.

For example, the spacer element is a cylindrical sleeve, and the first and/or the second stop is/are provided at the axial ends of the sleeve. The clamping mechanism can have a screw onto which said sleeve can be pushed such that the latter is held captively.

Alternatively, the spacer element can also be formed integrally with a clamping element and/or with a gripping section.

For example, a first clamping element has a screw and the second clamping element has a nut, wherein the nut is screwed onto the screw to apply the clamping force. The spacer element or a stop of the spacer element can be in the form, for example, of a protruding element on the screw or the nut.

BRIEF DESCRIPTION OF THE DRAWINGS

Further advantages and features become apparent from the following description in connection with the appended drawings. In the figures.

DETAILED DESCRIPTION OF THE PREFERRED EMBODIMENTS

Figure 1:
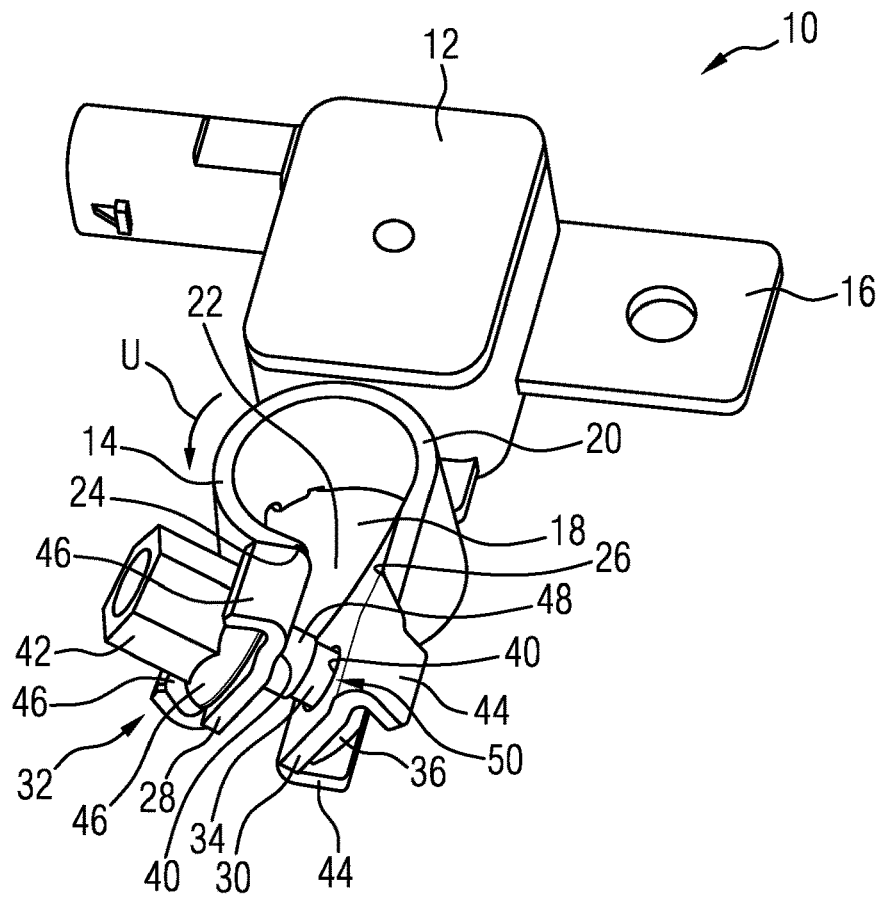
FIG. 1 shows a battery sensor with a battery pole terminal according to an aspect of the invention.

FIG. 1 shows a battery sensor 10 having a sensor device 12, not illustrated in detail, for detecting at least one battery parameter, for example the battery voltage, the battery power or the battery temperature, and having a battery pole terminal 14 and a cable connection 16 for contact connection of the battery sensor 10 to a cable of a vehicle power circuit.

The battery pole terminal 14 has a substantially cylindrical receiving space 18 with which the battery pole terminal 14 can be pushed onto a battery pole of a vehicle battery. The receiving space 18 is surrounded by an annular section 20 at least in sections in the circumferential direction U, wherein the annular section 20 has an interruption 22 with respect to the circumferential direction U with opposite edges 24, 26.

At each of the edges 24, 26, a gripping section 28, 30 is provided which is directed away from the receiving space 18 and at which a clamping mechanism 32 is provided. The clamping mechanism 32 has a screw 34 with an external thread, said screw lying with a head 36 on that side of the section 30 which faces away from the other section 28. The screw 34 extends in each case through an opening 38, 40 in the sections 28, 30. Furthermore, the clamping mechanism 32 has a nut 42 with an internal thread which corresponds to the screw 34 and lies on a side of the section 28 that faces away from the section 30.

Figure 2:
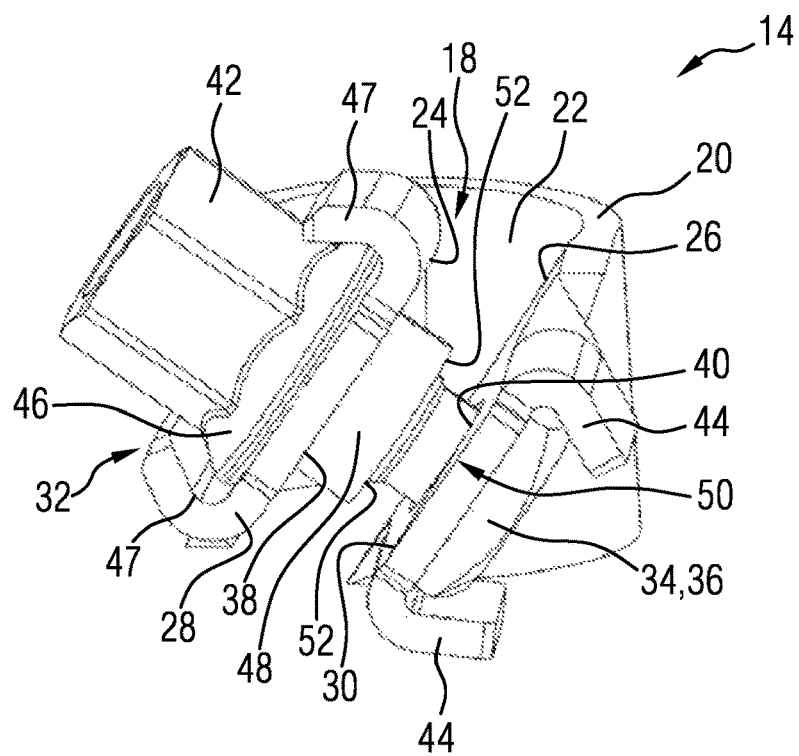
FIG. 2 shows a view of a detail of the battery pole terminal from FIG. 1.

As can be seen in FIGS. 1 and 2, the head 36 is rectangular and is held by two tabs 44 such that the screw 34 is held on the section 30. The tabs 44 have been bent over in particular after insertion of the screw 34.

The nut 42 has a flange 46 with which the nut 42 lies on the section 28 and which is surrounded by tabs 47 which hold the nut 42 on the section 28. The nut 42 furthermore has a sleeve-like spacer element 48 which protrudes over the flange 46 in the direction of the head 36 of the screw 34 and extends through the opening 38 in the section 28. In the embodiment shown here, the diameter of the spacer element 48 is larger than the diameter of the opening 40 on the opposite section 30.

The nut 42 can be twisted relative to the screw 34, i.e. can be screwed onto the screw 34. The screw 34 is secured against twisting by means of the rectangular head 36, and therefore, for the relative movement or screwing of the nut 42 and the screw 34, the nut 42 merely has to be rotated with a tool. By screwing of the nut 42 onto the screw 34, the flange 44 is moved toward the section 28 and the head 36 of the screw 34 is moved toward the section 30 such that a clamping force is exerted on the gripping sections 28, 30 or on the edges 24, 26, by means of which the edges 24, 26 are pushed toward each other.

In order to install the battery pole terminal 14, the latter is pushed in an installation direction, which corresponds to the longitudinal axis of the receiving space 18, with the annular section 20 onto a battery pole of a vehicle battery until the battery pole is completely located in the receiving space 18 and the battery pole terminal 14 rests on the base of the battery pole. Subsequently, the opposite edges 24, 26 are moved toward each other by the clamping mechanism 32 such that the diameter of the receiving space 18 or of the annular section 20 is reduced, and therefore the annular section 20 is clamped on the battery pole.

The sections 28, 30 are inclined relative to the longitudinal axis of the annular section 20, in particular at an angle of 30° to 40°, in particular at an angle of 34°. As a result, when a tool is placed onto the nut 42, a compressive force is exerted in the direction of the longitudinal axis of the annular section 20 on the battery pole terminal 14 such that the latter is pressed onto the battery pole. The angle with respect to the longitudinal axis of the annular section 20 is selected in such a manner that as high a tensile force as possible is nevertheless obtained on the annular section 20, i.e. as high a gripping force as possible of the annular section 20 on the battery pole.

Conventionally, for such battery pole terminals, a maximum installation force for the clamping mechanism 32 or a maximum torque for the screw 34 is predetermined, at which there is a sufficiently high gripping force of the battery pole terminal 14 on the battery pole. An increase in the gripping force by further screwing of the nut 42 onto the screw 34, i.e. the increasing of the clamping force of the clamping mechanism 32, would not lead to greater reliability of the holding force on the battery pole, but could lead to plastic deformation of the gripping sections 28, 30, as a result of which, during a subsequent removal and installation, for example during a change of the vehicle battery, the gripping force could change.

In order to prevent this, the spacer element 48 forms a force limiting mechanism 50 together with the gripping section 30 or the head 36 of the screw 34. If the gripping sections 28, 30 are moved toward each other by the clamping mechanism 32, at a defined minimum distance of the edges 24, 26 or of the gripping sections 28, 30, the spacer element 48 enters into contact with the section 30 by means of a first stop 52 which is formed by the axial end facing the section 30.

An increase in the installation force merely pushes the spacer element 48 against the gripping section 30 or the head 36, but does not lead to a higher force being exerted on the gripping sections 28, 30 or on the edges 24, 26, and therefore the edges 24, 26 are not moved further toward each other or the gripping sections 28, 30 are not subjected to a higher force.

The minimum distance is selected here in such a manner that a sufficiently high gripping force of the annular section 20 is exerted on the battery pole, but the clamping sections 28, 30 are reliably protected against permanent deformation. Even without the use of a tool specifying a maximum installation force, the battery pole terminal 14 is thus reliably protected against permanent deformation.

Figure 3:
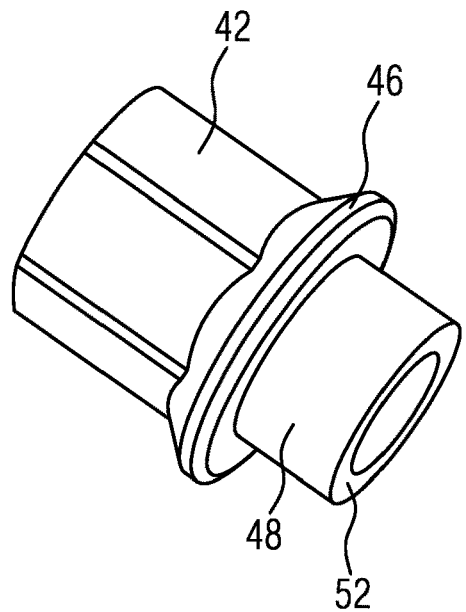
FIG. 3 shows a view of a detail of a clamping element of the battery pole terminal from FIG. 2.
Figure 4:
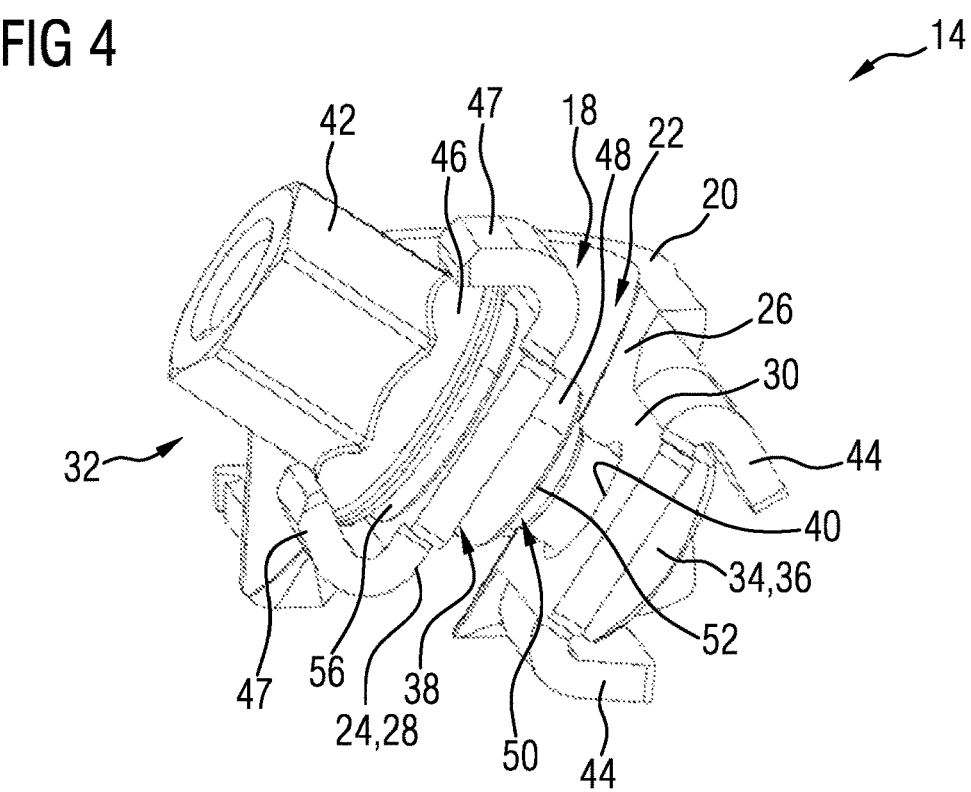
FIG. 4 shows a second embodiment of a battery pole terminal according to an aspect of the invention.
Figure 5:
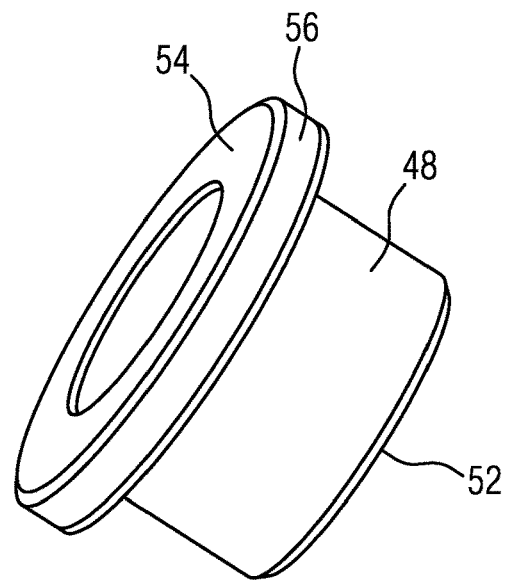
FIG. 5 shows a view of a detail of a clamping element of the battery pole terminal from FIG. 4.

The battery pole terminal 14 shown in FIGS. 4 and 5 substantially corresponds to the battery pole terminal 14 shown in FIGS. 2 and 3. However, the spacer element 48 is formed here as a separate component which lies on the nut 42 by means of a second stop 54, which is formed by the end facing away from the first stop. Furthermore, the spacer element 48 has a flange 56 with which the spacer element 48 lies on the gripping section 28 such that said spacer element cannot slide along the screw 34.

Figure 6:
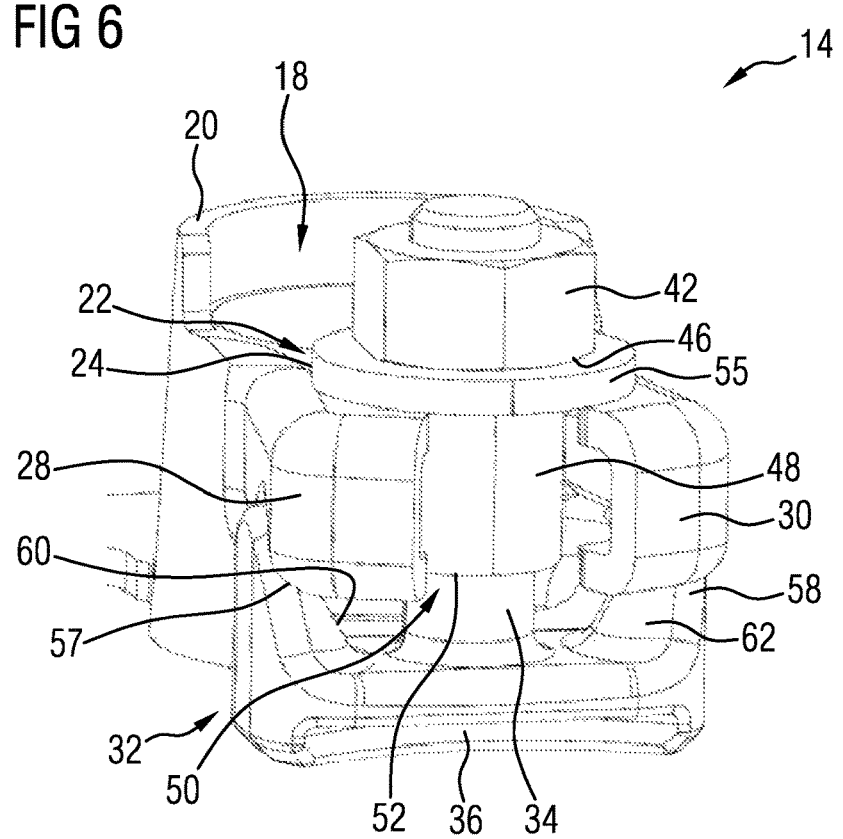
FIG. 6 shows a third embodiment of a battery pole terminal according to an aspect of the invention.
Figure 7:
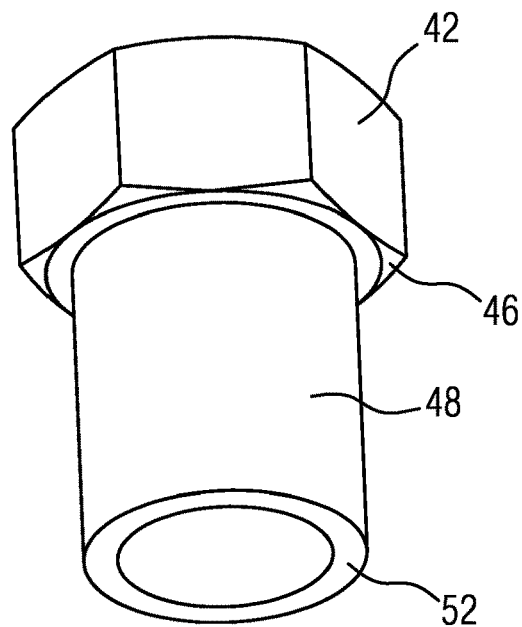
FIG. 7 shows a view of a detail of a clamping element of the battery pole terminal from FIG. 6.

In the embodiment shown in FIGS. 6 and 7, the annular section 20 has two symmetrically opposite gripping sections 28, 30. The clamping mechanism 32 likewise has a nut 42 on which a spacer element 48 is provided. A flange 46 of the nut 42 rests on a plain washer 55, which rests on the upper side of the gripping sections 28, 30, and therefore the nut 42, and thus the spacer element 48, are supported on the gripping sections 28, 30. The plain washer 55 can be a separate component or can be formed integrally with the nut 42. The head 36 of the screw 34 has two projections 57, 58 which point in the direction of the nut 42 and the mutually facing surfaces 60, 62 of which run conically toward each other away from the nut 42. The surfaces 60, 62 lie on the outer side of the sections 28, 30.

If the nut 42 is screwed onto the screw 34, the nut 42 is supported with the flange 54 on the upper side of the sections 28, 30 such that the head 36 of the screw 34 is pulled upward with respect to FIG. 6, i.e. in the direction of the nut 42. By means of the conically converging surfaces 60, 62, the sections 28, 30 are pushed toward each other, as a result of which the diameter of the annular section 20 is reduced and the annular section 20 is clamped on a battery pole. The screw 34 is arranged here in the direction of the longitudinal axis of the receiving space 18, wherein a clamping force is produced in the circumferential direction of the annular section by means of the clamping mechanism. The screw is thus arranged twisted by 90° with respect to the clamping force.

In this embodiment too, a minimum distance of the gripping sections 28, 30 or of the edges 24, 26 of the annular section 20 is defined by the spacer element 48. From a defined minimum distance, the first stop 52 lies on the head 34, and therefore a further increase in the installation force on the nut 42 does not lead to an increased gripping force of the annular section 20 of the battery pole terminal 14.

Figure 8:
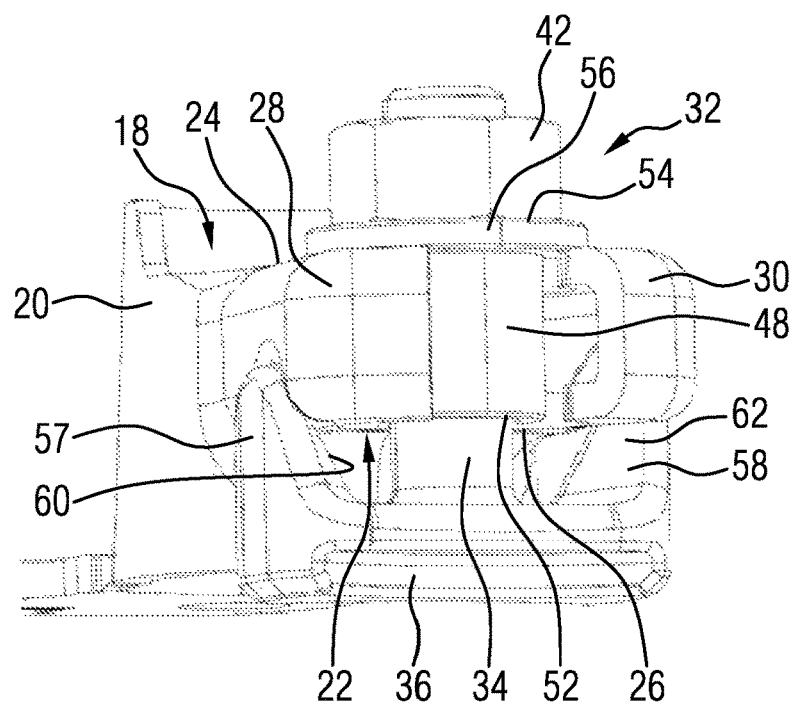
FIG. 8 shows a fourth embodiment of a battery pole terminal according to an aspect of the invention.
Figure 9:
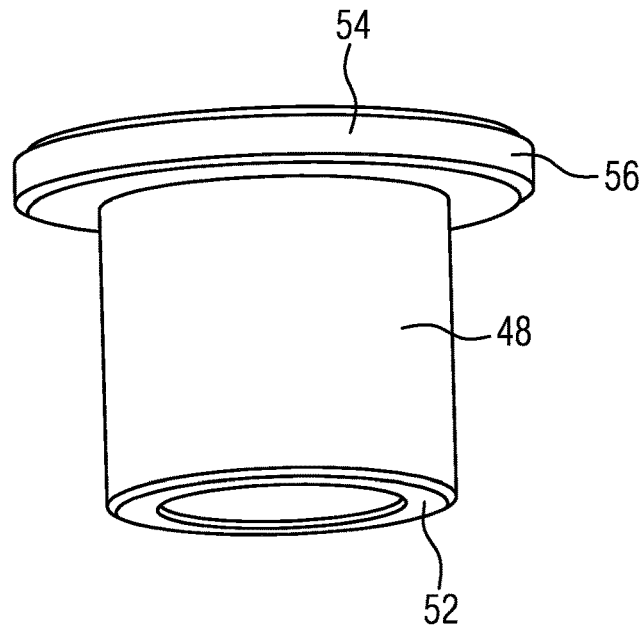
FIG. 9 shows a view of a detail of a clamping element of the battery pole terminal from FIG. 8.

The battery pole terminal 14 shown in FIGS. 8 and 9 substantially corresponds to the embodiment shown in FIGS. 6 and 7, wherein, analogously to the battery pole terminal 14 shown in FIGS. 4 and 5, the spacer element 48 is provided as a separate component which is pushed onto the screw 36 and secured by the nut 42.

Figure 10:
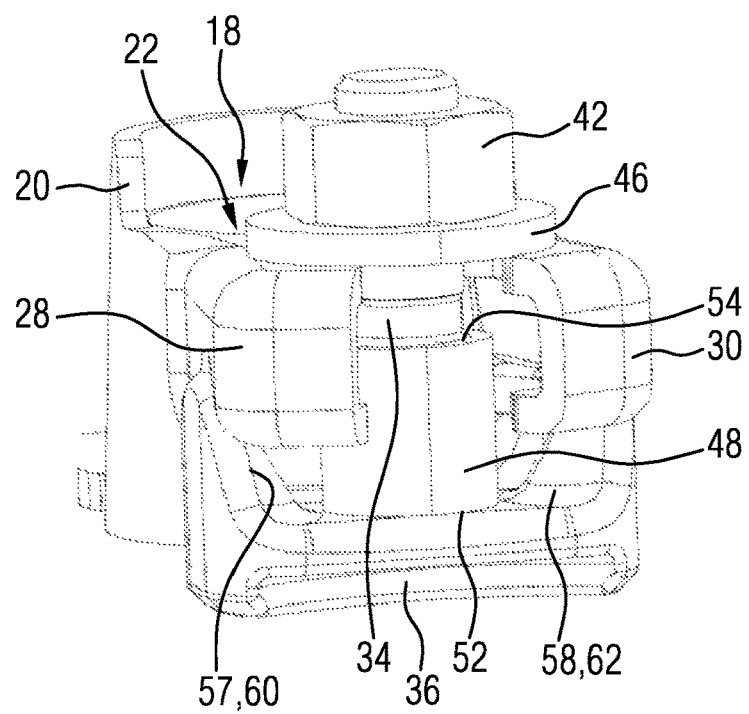
FIG. 10 shows a fifth embodiment of a battery pole terminal according to an aspect of the invention.
Figure 11:
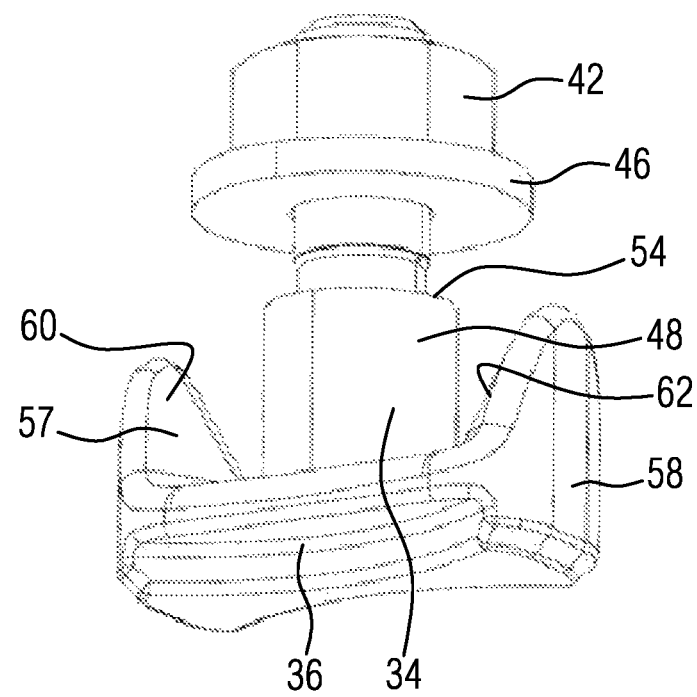
FIG. 11 shows a view of a detail of a clamping element of the battery pole terminal from FIG. 10.
Figure 12:
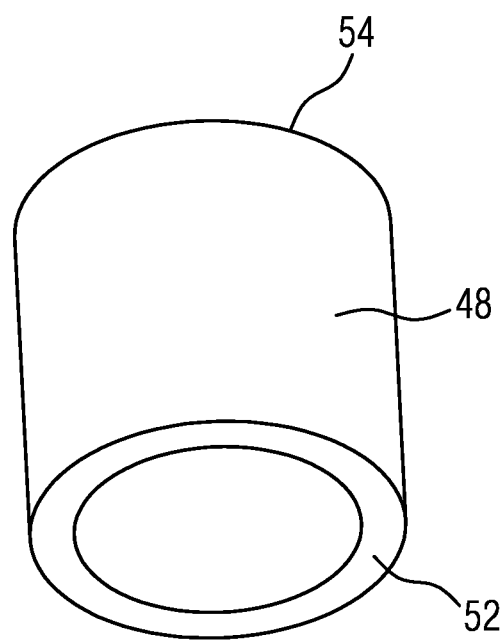
FIG. 12 shows a view of a detail of a spacer element of the battery pole terminal from FIG. 10.

The embodiment shown in FIGS. 10 to 12 substantially has a similar design to the battery pole terminal shown in FIGS. 8 and 9. The spacer element 48 here is merely in the form of a sleeve which is pushed onto the screw. The spacer element 48 lies with the first stop 52 on the head 36 of the screw 34, and the second stop 54 faces the nut 42. As soon as the second stop 54 lies on the plain washer 55, a further application of a clamping force to the annular section 20 or the gripping sections 28, 30 is no longer possible, and therefore plastic deformation of the clamping mechanism 32, in particular of the gripping sections 28, 30, is reliably prevented.

Instead of a separate sleeve, the latter may also be formed integrally with the screw 34.

Figure 13:
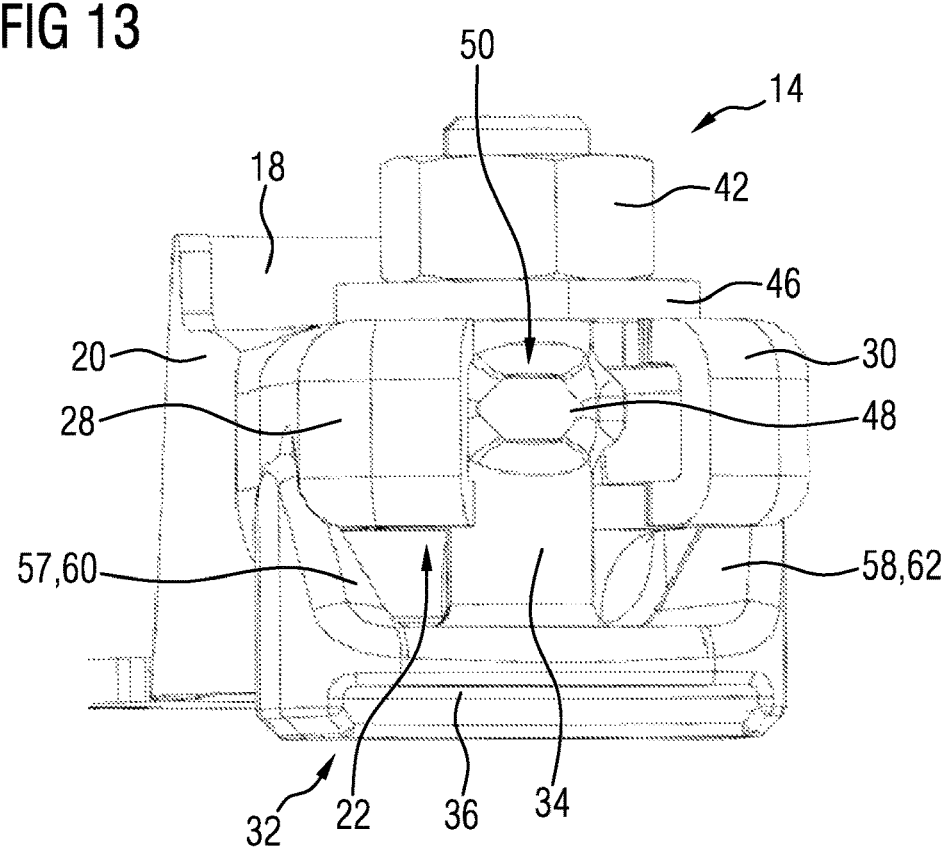
FIG. 13 shows a sixth embodiment of a battery pole terminal according to an aspect of the invention.
Figure 14:
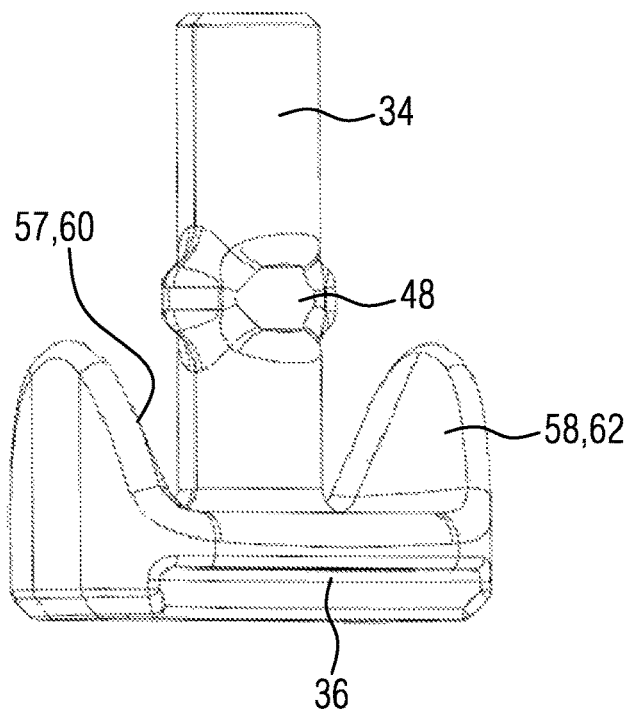
FIG. 14 shows a view of a detail of a clamping element of the battery pole terminal from FIG. 12.

In the embodiment shown in FIGS. 13 and 14, the spacer element 48 is formed by an embossment 48 in the screw 34, by means of which the nut 42 can be screwed on only as far as a defined position. From said position, the clamping mechanism 32 is thus blocked by the force limiting mechanism 50. Instead of the embossment, a thickening of the screw 34, for example a cylindrical thickening, may also be provided, analogously to a sleeve.

Irrespective of the embodiment, a force limiting mechanism 50 is thus provided in each case which, when a minimum distance between the edges 24, 26 is reached, prevents a higher force from being exerted on the edges 24, 26 or on the gripping sections 28, 30 on which the clamping mechanism 32 acts. As a result, plastic deformation of parts of the battery pole terminal 14 is reliably prevented.

Irrespective of the embodiment, a force limiting mechanism 50 is thus required in each case which, when the minimum distance is reached, lies with a stop 52, 54 on a part of the clamping mechanism and/or on a component of the annular section and prevents a further increase in the gripping force, for example by blocking the clamping mechanism or a further movement of the components of the annular section 20.

LIST OF REFERENCE SIGNS

10 Battery sensor
12 Sensor device
14 Battery pole terminal
16 Cable connection
18 Receiving space
20 Annular section
22 Interruption
24 Edge of the interruption
26 Edge of the interruption
28 Gripping section
30 Gripping section
32 Clamping mechanism
34 Screw
36 Head of the screw
38 Opening in the gripping section
40 Opening in the gripping section
42 Nut
44 Tabs
46 Flange
47 Tabs
48 Spacer element
50 Force limiting mechanism
52 First stop
54 Second stop
55 Plain washer
56 Flange
57 Projection
58 Projection
60 Surface
62 Surface

The invention claimed is:

1. A battery pole terminal, having an annular section, which surrounds a cylindrical or conical receiving space at least in sections in a circumferential direction, the annular section having an interruption with respect to the circumferential direction with two opposite edges, and a gripping section for a clamping mechanism being provided at each of the edges, and having the clamping mechanism which acts on the gripping sections and can exert a clamping force on the edges, pushing the opposite edges toward each other, wherein a force limiting mechanism is provided which, when a minimum distance between the edges is reached, prevents an increase in the clamping force on the gripping sections, wherein the clamping mechanism has two clamping elements which can be moved relative to each other, and wherein the force limiting mechanism blocks movement of at least one clamping element when the minimum distance is reached by directly contacting the at least one clamping element.

2. The battery pole terminal as claimed in claim 1, wherein the force limiting mechanism blocks movement with at least one stop when the minimum distance is reached.

3. The battery pole terminal as claimed in claim 1, wherein the force limiting mechanism has a spacer element, with a first stop, on which a contact surface of a first gripping section and/or of a first clamping element lies when the minimum distance is reached.

4. The battery pole terminal as claimed in claim 1, wherein the spacer element further includes a second stop on which a contact surface of a second gripping section and/or of a second clamping element lies when the minimum distance is reached.

5. The battery pole terminal as claimed in claim 3, wherein the spacer element is a separate component which is held at the clamping mechanism and/or at at least one of the gripping sections.

6. The battery pole terminal as claimed in claim 5, wherein the spacer element is a cylindrical sleeve, and the first and/or the second stop is/are provided at the axial ends of the sleeve.

7. The battery pole terminal as claimed in claim 3, wherein the spacer element is formed integrally with a clamping element and/or with a gripping section.

8. The battery pole terminal as claimed in claim 7, wherein a first clamping element has a screw and the second clamping element has a nut, wherein the nut is screwed onto the screw to apply the clamping force.

9. The battery pole terminal as claimed in claim 4, wherein the spacer element is a separate component which is held at the clamping mechanism and/or at at least one of the gripping sections.

10. The battery pole terminal as claimed in claim 4, wherein the spacer element is formed integrally with a clamping element and/or with a gripping section.

* * * * *